US012688042B2

(12) United States Patent
Ma et al.

(10) Patent No.: US 12,688,042 B2
(45) Date of Patent: Jul. 21, 2026

(54) DATA TRANSFER FOR DISCRETE DATA

(71) Applicant: Anhui Cambricon Information Technology Co., Ltd., Hefei (CN)

(72) Inventors: Xuyan Ma, Hefei (CN); Jianhua Wu, Hefei (CN); Shaoli Liu, Hefei (CN); Xiangxuan Ge, Hefei (CN); Hanbo Liu, Hefei (CN); Lei Zhang, Hefei (CN)

(73) Assignee: ANHUI CAMBRICON INFORMATION TECHNOLOGY CO., LTD., Hefei (CN)

( * ) Notice: Subject to any disclaimer, the term of this patent is extended or adjusted under 35 U.S.C. 154(b) by 192 days.

(21) Appl. No.: 17/619,765

(22) PCT Filed: Apr. 28, 2021

(86) PCT No.: PCT/CN2021/090621
§ 371 (c)(1),
(2) Date: Oct. 3, 2022

(87) PCT Pub. No.: WO2021/223638
PCT Pub. Date: Nov. 11, 2021

(65) Prior Publication Data
US 2024/0053988 A1      Feb. 15, 2024

(30) Foreign Application Priority Data
May 8, 2020      (CN) .......................... 202010383257.5

(51) Int. Cl.
*G06F 9/30*              (2018.01)
(52) U.S. Cl.
CPC ...... *G06F 9/30145* (2013.01); *G06F 9/30036* (2013.01)

(58) Field of Classification Search
None
See application file for complete search history.

(56) References Cited

U.S. PATENT DOCUMENTS

| | | | |
|---|---|---|---|
| 2010/0095086 A1* | 4/2010 | Eichenberger | G06F 9/30036 |
| | | | 712/E9.023 |
| 2012/0060015 A1 | 3/2012 | Eichenberger et al. | |

(Continued)

FOREIGN PATENT DOCUMENTS

| | | |
|---|---|---|
| CN | 101706760 A | 5/2010 |
| CN | 103095738 A | 5/2013 |

(Continued)

OTHER PUBLICATIONS

EP21800488.5—Extended European Search Report mailed on Feb. 13, 2024, 6 pages.

(Continued)

*Primary Examiner* — John M Lindlof
(74) *Attorney, Agent, or Firm* — Getech Law LLC; Jun Ye

(57) ABSTRACT

Provided are a data processing method and device, and a related product. The method comprises: when a decoded processing instruction is a data transfer instruction, determining a source data address and a destination data address of data corresponding to the processing instruction; and storing data read from the source data address to the destination data address to obtain vector data, wherein the source data address comprises multiple discrete data addresses, and the destination data address comprises continuous data addresses. By means of the method, the processing process can be simplified and the data overhead can be reduced.

11 Claims, 2 Drawing Sheets

S11

IF A DECODED PROCESSING INSTRUCTION IS A DATA TRANSFER INSTRUCTION, DETERMINE A SOURCE DATA ADDRESS AND A DESTINATION DATA ADDRESS OF DATA CORRESPONDING TO THE DECODED PROCESSING INSTRUCTION

S12

OBTAIN VECTOR DATA BY STORING DATA READ FROM THE SOURCE DATA ADDRESS TO THE DESTINATION DATA ADDRESS

(56)                    References Cited

U.S. PATENT DOCUMENTS

| | | | |
|---|---|---|---|
| 2014/0281373 A1* | 9/2014 | Nilsson | G06F 9/38 |
| | | | 712/7 |
| 2014/0281425 A1 | 9/2014 | Valentine et al. | |
| 2017/0177357 A1* | 6/2017 | Ould-Ahmed-Vall | ...................... |
| | | | G06F 12/084 |
| 2020/0125412 A1 | 4/2020 | Singh et al. | |

FOREIGN PATENT DOCUMENTS

| | | |
|---|---|---|
| CN | 103714007 A | 4/2014 |
| CN | 107861685 A | 3/2018 |

OTHER PUBLICATIONS

PCT/CN2021/090621—International Search Report and Written Opinion, mailed Jul. 15, 2021, 10 pages.
CN202010383257.5—First Office Action mailed on Dec. 2, 2024, 12 pages.
EP21800488.5—Communication pursuant to Article 94(3) mailed on Nov. 11, 2024, 4 pages.

* cited by examiner

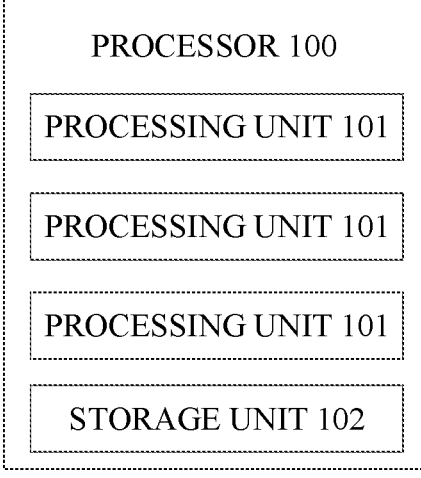

PROCESSOR 100

PROCESSING UNIT 101

PROCESSING UNIT 101

PROCESSING UNIT 101

STORAGE UNIT 102

FIG. 1

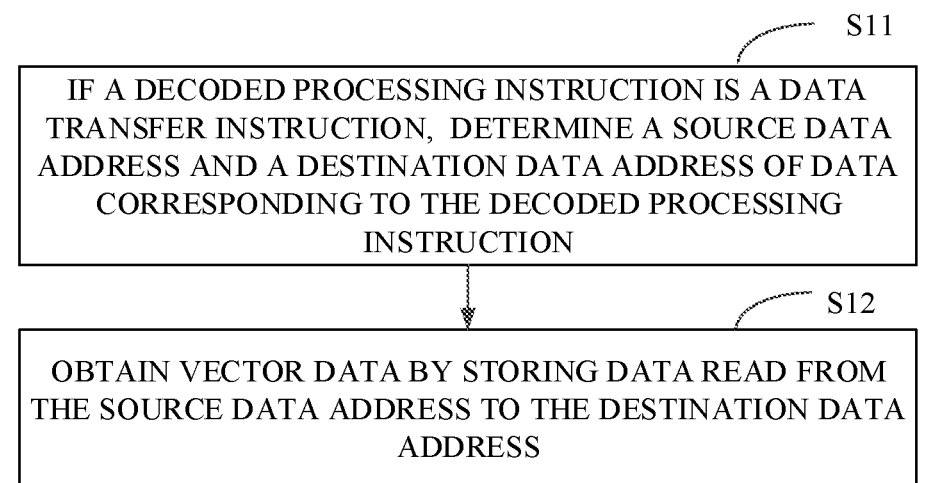

S11

IF A DECODED PROCESSING INSTRUCTION IS A DATA TRANSFER INSTRUCTION, DETERMINE A SOURCE DATA ADDRESS AND A DESTINATION DATA ADDRESS OF DATA CORRESPONDING TO THE DECODED PROCESSING INSTRUCTION

S12

OBTAIN VECTOR DATA BY STORING DATA READ FROM THE SOURCE DATA ADDRESS TO THE DESTINATION DATA ADDRESS

FIG. 2

DATA TRANSFER FOR DISCRETE DATA

CROSS REFERENCE OF RELATED APPLICATION

This is a 371 of International Application No. PCT/CN2021/090621, filed Apr. 28, 2021 which claims priority to Chinese Patent Application No. 202010383257.5, filed on May 8, 2020, and entitled "DATA PROCESSING METHOD, DATA PROCESSING DEVICE, AND RELATED PRODUCTS", the entire disclosures of which is are incorporated herein by reference.

TECHNICAL FIELD

The disclosure relates to the technical field of computers, and particularly to a data processing method, a data processing device, and related products.

BACKGROUND

With the development of artificial intelligence technology, the artificial intelligence technology has made great progress in image recognition and other fields. During the image recognition, a large number of discrete data points may be required to be processed (for example, a difference computation may be required to be performed). However, based on related technologies, a process of processing the discrete data points is relatively complicated, resulting in relatively large data overheads.

SUMMARY

In view of the above, it is necessary to provide a data processing method, a data processing device, and related products, to solve the technical problem above.

According to a first aspect of the disclosure, a data processing method is provided. The data processing method may include the following: a source data address and a destination data address of data corresponding to a decoded processing instruction are determined when the decoded processing instruction is a data transfer instruction; vector data is obtained by storing data read from the source data address to the destination data address, where the source data address may include a plurality of discrete data addresses, and the destination data address may include continuous data addresses.

According to a second aspect of the disclosure, a data processing device is provided. The data processing device may include an address determining unit and a data storage unit. The address determining unit may be configured to determine a source data address and a destination data address of data corresponding to a processing instruction when the decoded processing instruction is a data transfer instruction. The data storage unit may be configured to obtain vector data by storing data read from the source data address to the destination data address, where the source data address may include a plurality of discrete data addresses, and the destination data address may include continuous data addresses.

According to a third aspect of the disclosure, an artificial intelligence chip is provided. The artificial intelligence chip may include the data processing device above.

According to a fourth aspect of the disclosure, an electronic device is provided. The electronic device may include the artificial intelligence chip above.

According to a fifth aspect of the disclosure, a board card is provided. The board card may include a storage component, an interface device, a control component, and the artificial intelligence chip above. The artificial intelligence chip is coupled with the storage component, the control component, and the interface device, respectively. The storage component may be configured to store data. The interface device may be configured to implement data transmission between the artificial intelligence chip and an external device. The control component may be configured to monitor a state of the artificial intelligence chip.

According to embodiments of the disclosure, vector data may be obtained by transferring discrete data to continuous data addresses according to a data transfer instruction. As such, a vector computation and other processing may be implemented, which may simplify a processing process, thereby reducing data overheads.

By deriving technical features of claims, advantageous effects corresponding to the technical problem in the BACKGROUND may be achieved. According to detailed descriptions of exemplary embodiments with reference to accompanying drawings below, other features and aspects of the disclosure will become clear.

BRIEF DESCRIPTION OF THE DRAWINGS

Accompanying drawings contained in the specification and constituting a part of the specification together with the specification illustrate exemplary embodiments, features, and aspects of the disclosure, and the accompanying drawings are used to explain principles of the disclosure.

FIG. 1 is a schematic diagram illustrating a processor of a data processing method according to an embodiment of the disclosure.

FIG. 2 is a flowchart illustrating a data processing method according to an embodiment of the disclosure.

DETAILED DESCRIPTION

Figure 3:
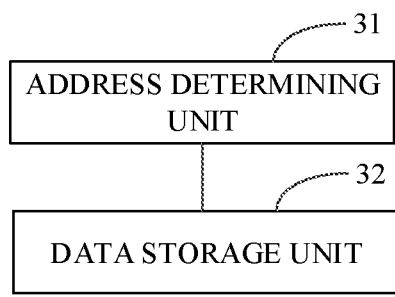
FIG. 3 is a block diagram illustrating a data processing device according to an embodiment of the disclosure.

Hereinafter, technical solutions of embodiments of the disclosure will be described in a clear and comprehensive manner with reference to accompanying drawings. Obviously, the embodiments described herein are some rather than all embodiments of the disclosure. Those of ordinary skill in the art will be able to derive other embodiments based on these embodiments without creative efforts, and all such derived embodiments shall all fall within the protection scope of the disclosure.

It should be understood that, terms such as "include/comprise" and "contain" as well as variations thereof used in the specification and claims of the disclosure mean existence of features, wholes, steps, operations, elements, and/or components described, but do not exclude existence or addition of one or more other features, wholes, steps, operations, elements, components, and/or sets.

It should also be understood that, terms used in the specification of the disclosure are merely for describing a specific embodiment, and not intended to limit the disclosure. As used in the specification and claims of the disclosure, unless the context clearly indicates otherwise, singular forms such as "a/an", "a piece of", and "the/this" also include plural forms. It should be further understood that, a term "and/or" used in the specification and claims of the disclosure refers to any combination of one or more of items listed in association and all possible combinations, and may include these combinations.

As used in the specification and claims, a term "if" may be interpreted as "when", "once", "in response to determining", or "in response to detecting" depending on the context. Similarly, a term "if determining" or "if detecting [the condition or event described]" may be interpreted as "once determining", "in response to determining", "once detecting [the condition or event described]", or "in response to detecting [the condition or event described]" depending on the context.

A data processing method of the embodiments of the disclosure may be applied to a processor. The processor may be a general-purpose processor, such as a central processing unit (CPU), or an intelligence processing unit (IPU) config- ured to perform artificial intelligence computations. The artificial intelligence computations may include a machine learning computation, a brain-like computation, and the like. The machine learning computation may include a neural network computation, a k-means computation, a support vector machine computation, and the like. The IPU may include, for example, one or a combination of a graphics processing unit (GPU), a neural-network processing unit (NPU), a digital signal process (DSP), and a field-programmable gate array (FPGA) chip. The disclosure does not limit the type of the processor.

In a possible implementation, the processor of the disclo- sure may include a plurality of processing units, and each of the plurality of processing units may independently run various tasks assigned, such as a convolution computation task, a pooling task, or a fully-connected task. The disclo- sure does not limit the processing units and the tasks run by the processing units. FIG. 1 is a schematic diagram illus- trating a processor of a data processing method according to an embodiment of the disclosure. As illustrated in FIG. 1, a processor 100 may include a plurality of processing units 101 and a storage unit 102. The plurality of processing units 101 may be configured to execute instruction sequences. The storage unit 102 may be configured to store data. The storage unit 102 may include a random-access memory (RAM) and a register file. The plurality of processing units 101 of the processor 100 may not only share part of a storage space (for example, the plurality of processing units 101 of the pro- cessor 100 may share part of the storage space of the RAM and the register file), but also have their own storage spaces.

FIG. 2 is a flowchart illustrating a data processing method according to an embodiment of the disclosure. As illustrated in FIG. 2, the method may include the following.

In a S11, the decoded processing instruction a source data address and a destination data address of data corresponding to a processing instruction are determined when the decoded processing instruction is a data transfer instruction.

In a S12, vector data is obtained by storing data read from the source data address to the destination data address, where the source data address may include a plurality of discrete data addresses, and the destination data address may include continuous data addresses.

According to embodiments of the disclosure, the vector data may be obtained by transferring discrete data to the continuous data addresses according to the data transfer instruction. As such, a vector computation and other pro- cessing may be implemented, which may simplify a pro- cessing process, thereby reducing data overheads.

In a possible implementation, the method may further include the following. The decoded processing instruction is obtained by decoding a received processing instruction. The decoded processing instruction may contain an operation code, and the operation code is used to indicate performing data transfer processing.

For example, when receiving the processing instruction, the processor may decode the received processing instruc- tion to obtain the decoded processing instruction. The decoded processing instruction may contain the operation code and an operation field. The operation code is used to indicate a processing type of the decoded processing instruc- tion, and the operation field is used to indicate data to be processed and a data parameter. If the operation code of the decoded processing instruction indicates performing the data transfer processing, the instruction is the data transfer instruction (for example, a Gather Load).

In a possible implementation, in the S11, if the decoded processing instruction is the data transfer instruction, the source data address and the destination data address of the data corresponding to the decoded processing instruction may be determined. The data corresponding to the decoded processing instruction is a plurality of pieces of discrete data which are indicated by the operation field of the decoded processing instruction. The source data address represents a current data storage address of the plurality of pieces of data in a data storage space and is the plurality of discrete data addresses. The destination data address indicates a data address in the data storage space to which the plurality of pieces of data are to be transferred and is continuous data addresses. The data storage space where the source data address is located may be the same as or different from the data storage space where the destination data address is located, which is not limited in the disclosure.

In a possible implementation, in the S12, after the source data address and the destination data address are determined, the processor may read the plurality of pieces of discrete data from the source data address and may store the plurality of pieces of discrete data that are read to the destination data address to obtain the vector data with a preset length, thereby completing the data transfer.

In a possible implementation, after the data transfer is completed, the vector data may be further processed accord- ing to a data computation instruction, such as a four- arithmetic computation on at least two pieces of vector data, or a difference computation on two pieces of vector data.

As such, if a large number of discrete paired data points are required to be computed in an application scenario such as image recognition, according to the data transfer instruc- tion, by transferring the discrete data to continuous address spaces to be aggregated as the vector data for a further vector computation, a computation of discrete data points may be converted into the vector computation, which may simplify the processing process, thereby reducing the data overheads.

In a possible implementation, the S11 may include: deter- mining source data addresses of the plurality of pieces of data respectively according to source data base addresses and data offset addresses of the plurality of pieces of data in the operation field of the decoded processing instruction.

For example, the data transfer instruction may have the operation field used for indicating a data parameter of data to be transferred. The operation field may include a source data base address, a destination data base address, a single point data size, a single point data number, an offset vector base address of a single data point, and an offset size, and the like.

The source data base address may represent a current base addresses of a plurality of discrete data points in the data storage space. The destination data base address may rep- resent the base address in the data storage space to which the plurality of pieces of data are to be transferred. The single point data size may represent a data size (for example, 4 bits or 8 bits) of each discrete data point. The single point data number may represent a count N of discrete data points, where N is an integer greater than 1. The offset vector base address of the single data point may represent an offset base address of each discrete data point relative to the source data base address. The offset size may represent a width of an offset address corresponding to each discrete data point, which is, for example, equal to the single point data size. The specific number and types of parameters in the operation field of the data transfer instruction are not limited in the disclosure.

In a possible implementation, an offset address of each data point may be determined respectively according to the offset vector base address of the single data point and the offset size in the operation domain. For example, for the n-th data point ($1 \leq n \leq N$), the offset vector base address of the data point is 24, and the offset size of the data point is 4, and then the offset address of the data point, which is Offset Address [n], is [24, 27]. As such, the source data address of the n-th data point may be determined according to the source data base address and the data offset address.

$$\text{Single Point Src Addr}[n] = \text{Source Data Base Address} + \text{Offset Address}[n] \quad (1).$$

In this formula (1), Single Point Src Addr[n] represents the source data address of the n-th data point. When the source data base address is, for example, Addr1[15], and the data offset address of the n-th data point is [24, 27], the source data address of the n-th data point may be determined to be Addr1[39,42].

In this way, the source data address of each piece of data may be determined respectively, so that each piece of data may be read from the source data address.

In a possible implementation, the S11 may include: determining destination data addresses of the plurality of pieces of data according to destination data base addresses and data sizes of the plurality of pieces of data in the operation field of the decoded processing instruction.

As described above, the operation field of the data transfer instruction may include a destination data base address and the single point data size. Since the destination data addresses are the continuous data addresses, the destination data address of each piece of data may be determined directly and sequentially according to the data sizes of the data points and serial numbers of each piece of data. The destination data address of the n-th data point may be expressed as:

$$\text{Single Point Dest Addr}[n] = \text{Destination Data Base Address} + n * \text{Single Point Data Size} \quad (2).$$

In this formula (2), Single Point Dest Addr[n] represents the destination data address of the n-th data point. When the destination data base address is, for example, Addr2[0, 3], and the single point data size is 4 bits, and n is equal to 3, the destination data address of a third data point may be determined to be Addr2[12, 15].

In this way, the destination data address of each piece of data may be determined respectively, so that each piece of data read from the source data address may be transferred to the destination data address of each piece of data respectively.

In a possible implementation, the S12 may include: reading each piece of data from the source data address of each piece of data in the plurality of pieces of data respectively; and obtaining the vector data by storing each piece of data to the destination data addresses sequentially.

For example, after the source data address and the destination data address of each piece of data in the operation field are determined, each piece of data may be read from the source data address of each piece of data and then may be stored to the destination data address sequentially. For example, if n is equal to 3, the data is read from the source data address Addr1[39,42] of the third data point and is stored to the destination data address Addr2[9,12], thereby completing the data transfer of the data point. In this way, each data point may be sequentially transferred to obtain N consecutive data points stored in the destination data address, thereby achieving a process of aggregating the discrete data points into the vector data.

In this way, the data transfer may be realized to provide a data basis for subsequent processing.

According to the data processing method of the embodiments of the disclosure, according to the data transfer instruction, by transferring the discrete data to the continuous address spaces to be aggregated as the vector data, if a large number of paired discrete data points are required to be computed in the application scenarios such as the image recognition, the computation of the discrete data points may be converted into the vector computation, thereby simplifying the processing process and reducing the data overheads.

It should be noted that, for the sake of simplicity, the foregoing method embodiments are described as a series of action combinations. However, those skilled in the art should know that the disclosure is not limited by the sequence of actions described because, according to the disclosure, certain steps may be performed in other orders or simultaneously. Besides, those skilled in the art also should know that the embodiments described in the specification are optional embodiments and the actions and modules involved are not necessarily essential to the disclosure.

It should be further noted that, although steps in the flowchart are displayed sequentially according to arrows, these steps are not necessarily executed in the order indicated by the arrows. Unless explicitly stated herein, the execution of these steps is not strictly limited by the order, and these steps may be executed in other orders. Moreover, at least part of the steps in the flowchart may include a plurality of sub-steps or stages. These sub-steps or stages are not necessarily executed simultaneously, but may be executed at different times. These sub-steps or stages are not necessarily executed sequentially, but may be executed in turns or alternately with other steps or at least part of the sub-steps or stages of other steps.

FIG. 3 is a block diagram illustrating a data processing device according to an embodiment of the disclosure. As illustrated in FIG. 3, the device may include: an address determining unit 31 and a data storage unit 32. The address determining unit 31 may be configured to determine a source data address and a destination data address of data corresponding to a decoded processing instruction when the decoded processing instruction is a data transfer instruction. The data storage unit 32 may be configured to obtain vector data by storing data read from the source data address to the destination data address, where the source data address may include a plurality of discrete data addresses, and the destination data address may include continuous data addresses.

In a possible implementation, the address determining unit 31 may include: a source address determining subunit. The source address determining subunit may be configured to determine source data addresses of a plurality of pieces of data respectively according to source data base addresses and data offset addresses of the plurality of pieces of data in an operation field of the decoded processing instruction.

In a possible implementation, the address determining unit 31 may include: a destination address determining subunit. The destination address determining subunit may be configured to determine destination data addresses of the plurality of pieces of data according to destination data base addresses and data sizes of the plurality of pieces of data in the operation field of the decoded processing instruction.

In a possible implementation, the data storage unit 32 may include: a reading subunit and a storage subunit. The reading subunit may be configured to read each piece of data from the source data addresses of each piece of data in the plurality of pieces of data respectively. The storage subunit may be configured to obtain the vector data by storing each piece of data to the destination data addresses sequentially.

In a possible implementation, the device may further include: a decoding unit. The decoding unit may be configured to obtain the decoded processing instruction by decoding a received processing instruction, where the decoded processing instruction may contain an operation code, and the operation code is used to indicate performing data transfer processing.

It should be understood that, the foregoing device embodiments are merely illustrative, and the device of the disclosure may be implemented in other manners. For example, a division of units/modules in the foregoing embodiments is only a logical function division and there may be other manners of division during actual implementations. For instance, a plurality of units, modules, or components may be combined or may be integrated into another system, or some features may be ignored or may not be performed.

In addition, unless indicated otherwise, functional units/modules in various embodiments of the disclosure may be integrated into one unit/module, or each unit/module may be physically present, or two or more units/modules may be integrated into one unit/module. The above-mentioned integrated unit/module may be implemented in the form of hardware or a software program module.

If the integrated unit/module is implemented in the form of hardware, the hardware may be a digital circuit, an analog circuit, and the like. The physical implementation of a hardware structure may include, but is not limited to, a transistor, a memristor, and the like. Unless specified otherwise, an artificial intelligence processor may be any appropriate hardware processor, such as a central processing unit (CPU), a graphics processing unit (GPU), a field-programmable gate array (FPGA), a digital signal processor (DSP), and an application-specific integrated circuit (ASIC). Unless specified otherwise, a storage unit may be any suitable magnetic storage medium or magneto-optical storage medium, such as a resistive random access memory (RRAM), a dynamic random access memory (DRAM), a static random access memory (SRAM), an enhanced dynamic random access memory (EDRAM), a high-bandwidth memory (HBM), and a hybrid memory cube (HMC), and the like.

If the integrated unit/module is implemented in the form of the software program module and is sold or used as a separate product, the integrated unit/module may be stored in a computer-readable memory. Based on such understanding, technical solutions of the disclosure essentially, or part of the technical solutions that contributes to the prior art, or all or part of the technical solutions, may be embodied in the form of a software product. The software product is stored in a memory and includes several instructions used to enable a computer device (which may be a personal computer, a server, or a network device, and the like) to perform all or part of steps of the method of various embodiments of the disclosure. The aforementioned memory may include various medium capable of storing program codes, such as a universal serial bus (USB), a read-only memory (ROM), a random access memory (RAM), a removable hard disk, a disk, and a compact disc.

In a possible implementation, an artificial intelligence chip is further provided. The artificial intelligence chip may include the data processing device above.

In a possible implementation, an electronic device is further provided. The electronic device may include the artificial intelligence chip above.

In a possible implementation, a board card is further provided. The board card may include a storage component, an interface device, a control component, and the artificial intelligence chip above. The artificial intelligence chip is coupled with the storage component, the control component, and the interface device respectively. The storage component may be configured to store data. The interface device may be configured to implement data transmission between the artificial intelligence chip and an external device. The control component may be configured to monitor a state of the artificial intelligence chip.

Figure 4:
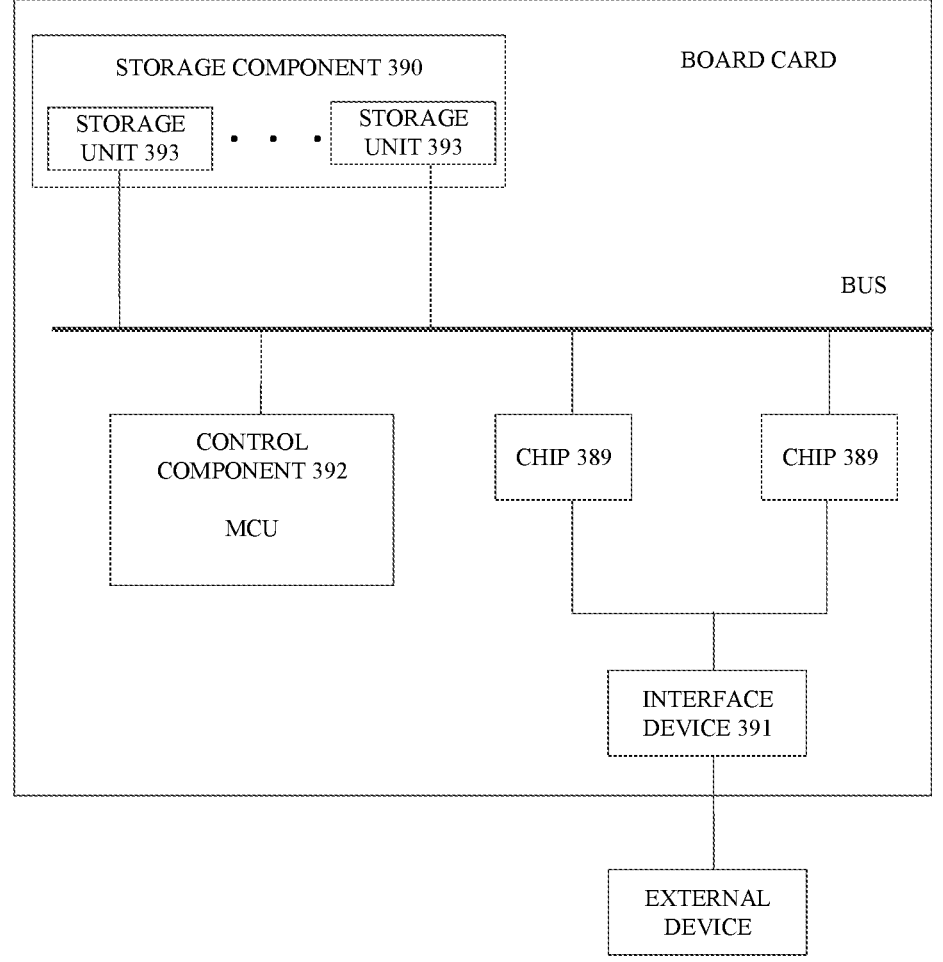
FIG. 4 is a structural block diagram of a board card according to an embodiment of the disclosure.

FIG. 4 is a structural block diagram of a board card according to an embodiment of the disclosure. Referring to FIG. 4, the board card may include other supporting components in addition to chips 389 described above. The supporting components may include, but are not limited to, a storage component 390, an interface device 391, and a control component 392.

The storage component 390 is coupled with the artificial intelligence chip via a bus, and may be configured to store data. The storage component may include a plurality of groups of storage units 393. Each group of storage units is coupled with the artificial intelligence chip via the bus. It may be understood that, each group of storage units may be a double data rate (DDR) synchronous dynamic random-access memory (SDRAM).

The DDR may double a speed of the SDRAM without increasing clock frequency. The DDR may allow data to be read on rising and falling edges of a clock pulse. A speed of the DDR is twice that of a standard SDRAM. In an embodiment, the storage component may include four groups of storage units. Each group of storage units may include a plurality of DDR4 particles (chips). In an embodiment, the artificial intelligence chip may include four 72-bit DDR4 controllers. For a 72-bit DDR4 controller, 64 bits are used for data transmission and 8 bits are used for an error checking and correcting (ECC) parity. It may be understood that, if a DDR4-3200 particle is used in each group of storage units, a theoretical bandwidth of the data transmission may reach 25600 MB/s.

In an embodiment, each group of storage units may include a plurality of DDR SDRAMs arranged in parallel. The DDR may allow data to be transmitted twice in a clock cycle. A controller configured to control the DDR is arranged in the chip, and the controller is used to control the data transmission and data storage of each storage unit.

The interface device is electrically connected with the artificial intelligence chip. The interface device may be configured to implement the data transmission between the artificial intelligence chip and an external device (for example, a server or a computer). For example, in an embodiment, the interface device may be a standard peripheral component interconnect express (PCIe) interface. For example, data to be processed is transferred from the server to the chip through the standard PCIe interface to realize data transfer. In some embodiments, if a PCIe 3.0 X 16 interface is used for the transmission, the theoretical bandwidth may reach 16000 MB/s. In another embodiment, the interface device may also be other interfaces, and the disclosure does not limit specific manifestations of the other interfaces mentioned above, as long as an interface unit may realize a transfer function. In addition, a calculation result of the artificial intelligence chip is still transferred back to the external device (for example, the server) through the interface device.

The control component is electrically connected with the artificial intelligence chip. The control component may be configured to monitor a state of the artificial intelligence chip. Specifically, the artificial intelligence chip is electrically connected with the control component through a serial peripheral interface (SPI). The control component may include a micro controller unit (MCU). If the artificial intelligence chip may include a plurality of processing chips, a plurality of processing cores, or a plurality of processing circuits, the artificial intelligence chip may drive a plurality of loads. Therefore, the artificial intelligence chip may be in different working states, such as a multi-load state and a light-load state. Through the control component, regulation and control of the working states of the plurality of processing chips, the plurality of processing, and/or the plurality of processing circuits in the artificial intelligence chip may be realized.

In a possible implementation, an electronic device is provided. The electronic device may include the artificial intelligence chip above. The electronic device may include a data processing device, a robot, a computer, a printer, a scanner, a tablet, a smart terminal, a mobile phone, a traffic recorder, a navigator, a sensor, a webcam, a server, a cloud server, a camera, a video camera, a projector, a watch, a headphone, a mobile storage, a wearable device, a vehicle, a household appliance, and/or medical equipment. The vehicle may include an airplane, a ship, and/or a car. The household appliance may include a television, an air conditioner, a microwave oven, a refrigerator, an electric rice cooker, a humidifier, a washing machine, an electric lamp, a gas cooker, and a range hood. The medical equipment may include a nuclear magnetic resonance spectrometer, a B-ultrasonic scanner, and/or an electrocardiograph.

In the foregoing embodiments, the description of each embodiment has its own emphasis. For parts that are not described in detail in an embodiment, reference may be made to related descriptions in other embodiments. Technical features of the foregoing embodiments may be combined arbitrarily. For the sake of concise description, not all possible combinations of various technical features in the foregoing embodiments are described. However, as long as there is no contradiction in a combination of these technical features, this combination should be considered as falling within the scope of the specification.

The foregoing may be better understood according to the following articles.

A1. A data processing method, comprising:
determining a source data address and a destination data address of data corresponding to a decoded processing instruction when the decoded processing instruction is a data transfer instruction; and
obtaining vector data by storing data read from the source data address to the destination data address, where the source data address includes a plurality of discrete data addresses, and the destination data address includes continuous data addresses.

A2. The method of A1, where determining the decoded processing instruction, the source data address and the destination data address of the data corresponding to the decoded processing instruction when the decoded processing instruction is the data transfer instruction includes:
determining source data addresses of a plurality of pieces of data respectively according to source data base addresses and data offset addresses of the plurality of pieces of data in an operation field of the decoded processing instruction.

A3. The method of A1 or A2, where determining the decoded processing instruction the source data address and the destination data address of the data corresponding to the decoded processing instruction when the decoded processing instruction is the data transfer instruction includes:
determining destination data addresses of the plurality of pieces of data according to destination data base addresses and data sizes of the plurality of pieces of data in the operation domain of the decoded processing instruction.

A4. The method of any one of A1 to A3, where obtaining the vector data by storing the data read from the source data address to the destination data address includes:
reading each piece of data from a source data address of each piece of data in the plurality of pieces of data respectively; and
obtaining the vector data by storing each piece of data to the destination data address sequentially.

A5. The method of any one of A1 to A4, further comprising:
obtaining the decoded processing instruction by decoding a received processing instruction, where the decoded processing instruction contains an operation code, and the operation code is used to indicate performing data transfer processing.

A6. A data processing device, comprising:
an address determining unit configured to determine a source data address and a destination data address of data corresponding to a decoded processing instruction when the decoded processing instruction is a data transfer instruction; and
a data storage unit configured to obtain vector data by storing data read from the source data address to the destination data address, where the source data address includes a plurality of discrete data addresses, and the destination data address includes continuous data addresses.

A7. The device of A6, where the address determining unit includes:
a source address determining subunit configured to determine source data addresses of a plurality of pieces of data respectively according to source data base addresses and data offset addresses of the plurality of pieces of data in an operation field of the decoded processing instruction.

A8. The device of A6 or A7, where the address determining unit includes:
a destination address determining subunit configured to determine destination data addresses of the plurality of pieces of data according to destination data base addresses and data sizes of the plurality of pieces of data in the operation field of the decoded processing instruction.

A9. The device of any one of A6 to A8, where the data storage unit includes:

a reading subunit configured to read each piece of data from the source data address of each piece of data in the plurality of pieces of data respectively; and a storage subunit configured to obtain the vector data by storing the each piece of data to the destination data address sequentially.

A10. The device of any one of A6 to A9, further comprising:

a decoding unit configured to obtain the decoded processing instruction by decoding a received processing instruction, where the decoded processing instruction contains an operation code, and the operation code is used to indicate performing data transfer processing.

A11. An artificial intelligence chip, comprising the data processing device of any one of A6 to A10.

A12. An electronic device, comprising the artificial intelligence chip of A11.

A13. Aboard card, comprising a storage component, an interface device, and a control component, and the artificial intelligence chip of A11, where the artificial intelligence chip is coupled with the storage component, the control component, and the interface device respectively, where the storage component is configured to store data; the interface device is configured to implement data transmission between the artificial intelligence chip and an external device; and the control component is configured to monitor a state of the artificial intelligence chip.

The embodiments of the disclosure have been described in detail above. The principles and implementations of the disclosure are described in combination with specific examples, and the descriptions of the foregoing embodiments are merely used to help understand the method and core ideas of the disclosure. At the same time, any changes or modifications based on the embodiments and the application scope of the disclosure made by those skilled in the art, without departing from the spirits of the disclosure, shall all be encompassed within the protection scope of the disclosure. In conclusion, the content of the specification should not be construed as a limitation on the disclosure.

What is claimed:

1. A data processing method, comprising:

determining a source data address and a destination data address of data corresponding to a decoded processing instruction when the decoded processing instruction is a data transfer instruction, wherein an operation field of the decoded processing instruction includes a source data base address, a destination data base address, a single point data size, a single point data number, an offset vector base address of a single data point, and an offset size, wherein the source data base address represents current base addresses of a plurality of discrete data points in a data storage space, wherein the destination data base address represents a base address in the data storage space to which a plurality of pieces of data are to be transferred, wherein the source data address and the destination data address are located in the same data storage space, wherein the single point data size represents a data size of each of the plurality of discrete data points, wherein the single point data number represents a count of the plurality of discrete data points, wherein the offset vector base address of the single data point represents an offset base address of each of the plurality of discrete data points relative to the source data base address, and wherein the offset size represents a width of an offset address corresponding to each of the plurality of discrete data points, and the offset size is equal to the single point data size;

obtaining vector data by storing data read from the source data address to the destination data address, wherein the source data address includes a plurality of discrete data addresses, and the destination data address includes continuous data addresses; and processing the obtained vector data according to a data computation instruction, wherein the data computation instruction includes one of:

performing at least one arithmetic operation, on at least two pieces of the obtained vector data, wherein the at least one arithmetic operation is selected from the group consisting of addition, subtraction, multiplication, and division; or a difference computation between two pieces of the obtained vector data.

2. The method of claim 1, wherein the determining of the source data address and the destination data address of the data corresponding to the decoded processing instruction when the decoded processing instruction is the data transfer instruction includes:

determining source data addresses of the plurality of pieces of data respectively according to source data base addresses and data offset addresses of the plurality of pieces of data in an operation field of the decoded processing instruction.

3. The method of claim 1, wherein the determining of the source data address and the destination data address of the data corresponding to the decoded processing instruction when the decoded processing instruction is the data transfer instruction includes:

determining destination data addresses of the plurality of pieces of data respectively according to destination data base addresses and data sizes of the plurality of pieces of data in an operation field of the decoded processing instruction.

4. The method of claim 1, wherein the obtaining of the vector data by the storing of the data read from the source data address to the destination data address includes:

reading each piece of data from the source data address of each of the plurality of pieces of data respectively; and obtaining the vector data by storing each of the plurality of pieces of data to the destination data address sequentially.

5. The method of claim 1, further comprising:

obtaining the decoded processing instruction by decoding a received processing instruction, wherein the decoded processing instruction contains an operation code, and the operation code is used to indicate performing data transfer processing.

6. A data processing device, comprising:

an address determining circuit configured to determine a source data address and a destination data address of data corresponding to a decoded processing instruction when the decoded processing instruction is a data transfer instruction, wherein an operation field of the decoded processing instruction includes a source data base address, a destination data base address, a single point data size, a single point data number, an offset vector base address of a single data point, and an offset size,

wherein the source data base address represents current base addresses of a plurality of discrete data points in a data storage space, wherein the destination data base address represents a base address in the data storage space to which a plurality of pieces of data are to be transferred, wherein the source data address and the destination data address are located in the same data storage space, wherein the single point data size represents a data size of each of the plurality of discrete data points, wherein the single point data number represents a count of the plurality of discrete data points, wherein the offset vector base address of the single data point represents an offset base address of each of the plurality of discrete data points relative to the source data base address, and wherein the offset size represents a width of an offset address corresponding to each of the plurality of discrete data points, and the offset size is equal to the single point data size;

a data storage circuit configured to obtain vector data by storing data read from the source data address to the destination data address, wherein the source data address comprises a plurality of discrete data addresses, and the destination data address comprises continuous data addresses; and a processing circuit configured to process a data computation instruction, wherein the data computation instruction includes one of:

performing at least one arithmetic operation, on at least two pieces of the obtained vector data, wherein the at least one arithmetic operation is selected from the group consisting of addition, subtraction, multiplication, and division; or a difference computation between two pieces of the obtained vector data.

7. The device of claim 6, wherein the address determining circuit includes:

a source address determining sub-circuit configured to determine source data addresses of the plurality of pieces of data respectively according to source data base addresses and data offset addresses of the plurality of pieces of data in an operation field of the decoded processing instruction.

8. The device of claim 6, wherein the address determining circuit includes:

a destination address determining sub-circuit configured to determine destination data addresses of the plurality of pieces of data according to destination data base addresses and data sizes of the plurality of pieces of data in an operation field of the decoded processing instruction.

9. The device of claim 6, wherein the data storage circuit includes:

a reading sub-circuit configured to read each piece of data from the source data address of each of the plurality of pieces of data respectively; and a storage sub-circuit configured to obtain the vector data by storing each of the plurality of pieces of data to the destination data address sequentially.

10. The device of claim 6, further comprising:

a decoding circuit configured to obtain the decoded processing instruction by decoding a received processing instruction, wherein the decoded processing instruction contains an operation code, and the operation code is used to indicate performing data transfer processing.

11. An electronic device, comprising an artificial intelligence chip that includes a data processing device, comprising:

an address determining circuit configured to determine a source data address and a destination data address of data corresponding to a decoded processing instruction when the decoded processing instruction is a data transfer instruction, wherein an operation field of the decoded processing instruction includes a source data base address, a destination data base address, a single point data size, a single point data number, an offset vector base address of a single data point, and an offset size, wherein the source data base address represents current base addresses of a plurality of discrete data points in a data storage space, wherein the destination data base address represents a base address in the data storage space to which a plurality of pieces of data are to be transferred, wherein the source data address and the destination data address are located in the same data storage space, wherein the single point data size represents a data size of each of the plurality of discrete data points, wherein the single point data number represents a count of the plurality of discrete data points, wherein the offset vector base address of the single data point represents an offset base address of each of the plurality of discrete data points relative to the source data base address, and wherein the offset size represents a width of an offset address corresponding to each of the plurality of discrete data points, and the offset size is equal to the single point data size;

a data storage circuit configured to obtain vector data by storing data read from the source data address to the destination data address, wherein the source data address comprises a plurality of discrete data addresses, and the destination data address comprises continuous data addresses; and a processing circuit configured to process a data computation instruction, wherein the data computation instruction includes one of:

performing at least one arithmetic operation, on at least two pieces of the obtained vector data, wherein the at least one arithmetic operation is selected from the group consisting of addition, subtraction, multiplication, and division; or a difference computation between two pieces of the obtained vector data.

* * * * *